United States Patent
Schmidt (10) Patent No.: US 12,181,413 B2
(45) Date of Patent: Dec. 31, 2024

(54) METHOD, COMPUTER PROGRAM, AND APPARATUS FOR ADAPTING AN ESTIMATOR FOR USE IN A MICROSCOPE

(71) Applicant: Abberior Instruments GmbH, Goettingen (DE)

(72) Inventor: Roman Schmidt, Goettingen (DE)

(73) Assignee: Abberior Instruments GmbH, Goettingen (DE)

( * ) Notice: Subject to any disclaimer, the term of this patent is extended or adjusted under 35 U.S.C. 154(b) by 0 days.

(21) Appl. No.: 18/607,821

(22) Filed: Mar. 18, 2024

(65) Prior Publication Data
US 2024/0219304 A1 Jul. 4, 2024

Related U.S. Application Data

(63) Continuation of application No. 17/394,498, filed on Aug. 5, 2021, now Pat. No. 11,933,729.

(30) Foreign Application Priority Data

Aug. 7, 2020 (EP) .................................. 20190122

(51) Int. Cl.
 *G01N 21/64* (2006.01)
 *G02B 21/16* (2006.01)
 *G06T 7/00* (2017.01)

(52) U.S. Cl.
 CPC ......... *G01N 21/6458* (2013.01); *G02B 21/16* (2013.01); *G06T 7/0014* (2013.01); *G06T 2207/10064* (2013.01)

(58) Field of Classification Search
 CPC ................ G01N 21/6458; G02B 21/16; G06T 7/0014; G06T 2207/10064
 (Continued)

(56) References Cited

U.S. PATENT DOCUMENTS

| 5,880,465 A | 3/1999 | Boettner et al. |
| 2003/0137659 A1* | 7/2003 | Milshtein ........... G01N 21/8806 356/237.2 |

(Continued)

OTHER PUBLICATIONS

Stefan W. Hell et al., "Breaking the diffraction resolution limit by stimulated emission: stimulated-emission-depletion fluorescence microscopy", Optics Letters / vol. 19, No. 11 / Jun. 1, 1994.
(Continued)

*Primary Examiner* — Gabriel I Garcia
(74) *Attorney, Agent, or Firm* — MOSER TABOADA (57) ABSTRACT

The present invention is related to a method, a computer program, and apparatus for adapting an estimator for use in a microscope for estimating a position of an emitter in a sample based on a method, in which the sample is illuminated with light at one or more sets of probe positions and fluorescence photons are acquired for the sets of probe positions. The invention is further related to a microscope, which makes use of such a method or apparatus. The sample is illuminated with light at one or more sets of probe positions and fluorescence photons are acquired for the sets of probe positions. Photon counts of the acquired photons are then added to vectors of photon counts or sums of photon counts are determined for the sets of probe positions. A value representative of background noise is determined and used for adapting the estimator in real-time.

20 Claims, 7 Drawing Sheets

(58) Field of Classification Search
USPC .......................................................... 250/362
See application file for complete search history.

(56) References Cited

U.S. PATENT DOCUMENTS

| | | |
|---|---|---|
| 2007/0187595 A1 | 8/2007 | Tanaka et al. |
| 2008/0174770 A1* | 7/2008 | Khurana ............... G01R 31/311 356/237.1 |
| 2010/0316269 A1* | 12/2010 | Zhuang ............... G01N 21/6428 382/128 |
| 2013/0001436 A1* | 1/2013 | Zhuang ............... G01N 21/6428 250/200 |
| 2016/0363748 A1 | 12/2016 | Kitagawa et al. |

OTHER PUBLICATIONS

Stefan W. Hell, "Toward fluorescence nanoscopy", Nature Biotechnology, vol. 21, No. 11 Nov. 2003.
Eric Betzig et al., "Imaging Intracellular Fluorescent Proteins at Nanometer Resolution", Science, vol. 313, Oct. 2006, DOI: 10.1126/science.1127344 . Source: PubMed.
Sharonov et al., "Wide-field subdiffraction imaging by accumulated binding of diffusing probes", PNAS, Dec. 12, 2006, vol. 103, No. 50, 18911-18916.
Stefan W. Hell et al., "Far-Field Optical Nanoscopy", Science 316, 1153 (2007); DOI: 10.1126/science.1137395.
Balzarotti et al., "Supplementary Materials for Nanometer resolution imaging and tracking of fluorescent molecules with minimal photon fluxes", SCIENCE, vol. 355, No. 6325, Dec. 22, 2016 (Dec. 22, 2016), pp. 606-612, XP055767212, US ISSN: 0036-8075, DOI:10.1126/science.aak9913, p. 14.
Balzarotti et al., "Nanometer resolution imaging and tracking of fluorescent molecules with minimal photon fluxes", Science Feb. 10, 2017: vol. 355, Issue 6325, pp. 606-612, DOI: 10.1126/science.aak9913.
Eilers et al., "MINFLUX monitors rapid molecular jumps with superior spatiotemporal resolution", PNAS, Jun. 12, 2018, vol. 115, No. 24, 6117-6122.
Gwosch et al., "MINFLUX nanoscopy delivers 3D multicolor nanometer resolution in cells", Nature Methods, Nature Pub. Group, New York, vol. 17, No. 2, Jan. 13, 2020 (Jan. 13, 2020), pp. 217-224, XP037006746, ISSN: 1548-7091, DOI: 10.1038/S41592-019-0688-0.
European Search Report dated Jan. 29, 2021 for Application No. EP 20190122.0.

* cited by examiner

METHOD, COMPUTER PROGRAM, AND APPARATUS FOR ADAPTING AN ESTIMATOR FOR USE IN A MICROSCOPE

CROSS-REFERENCE TO RELATED APPLICATIONS

This Application is a continuation of co-pending U.S. patent application Ser. No. 17/394,498, filed Aug. 5, 2021, which claims priority to European Patent Application No. 20190122.0, filed Aug. 7, 2020, which are incorporated herein by reference in their entireties.

BACKGROUND OF THE INVENTION a. Field of the Invention

The present invention is related to a method, a computer program, and an apparatus for adapting an estimator for use in a microscope for estimating a position of an emitter in a sample. The invention is further related to a microscope, which makes use of such a method or apparatus.

b. Description of the Prior Art

Fluorescence microscopy has experienced a second resolution boost due to the synergistic combination of the specific strengths of the coordinate-targeted super-resolution family represented by STED (STimulated Emission Depletion) and RESOLFT (REversible Saturable OpticaL Fluorescence Transitions) and its coordinate-stochastic counterpart comprising PALM (PhotoActivated Localization Microscopy)/STORM (STochastic Optical Reconstruction Microscopy) and PAINT (Point Accumulation for Imaging in Nanoscale Topography). The resulting synergistic concept, called MINFLUX (MINimal photon FLUXes), has closed the prevalent resolution gap from ~20-30 nm in STED, PALM/STORM, and other fluorescence nanoscopies to the 1-5 nm size scale of the molecules themselves.

At its core, MINFLUX localization is based on the important rationale of injecting a reference coordinate in the sample using a structured optical beam, such as a donut with a central intensity minimum, i.e. a zero. The position of the zero in the sample defines the targeted sample coordinate. The MINFLUX concept equally applies to entire sets of reference coordinates, i.e. line- and point-like zeros, and parallelized detection in the widefield. Coordinate targeting enables a well-controlled and therefore photon-efficient localization of fluorescent molecules, because the fluorophore coordinate to be determined is no longer found by establishing the center of a feeble, diffraction-limited fluorescence spot emerging on a camera. Instead, the fluorophore is localized by actively targeting the zero of the excitation donut to the fluorophore. Concretely, the excitation intensity zero is brought as closely as possible to the molecule in well thought-out iterations, until the detected fluorescence rate approximately matches that of the background noise. In this closest proximity, only a minimal number of fluorescence photons are needed to gain maximal localization precision, because establishing the remaining distance between the coordinate targeted by the donut zero and the molecular position requires much fewer detected photons. Thus, injecting" or targeting a reference coordinate in the sample shifts the burden of requiring many fluorescence photons for localization to the inexhaustible number of photons in the donut-shaped excitation beam.

Since MINFLUX localization is no longer limited by waiting for large numbers of fluorescence photons, this nanometer-precise localization is much faster than the camera-based localization used in PALM/STORM. The idea of optically injecting a coordinate using a donut zero is inherently also present in the original STED concept. For STED microscopy, it is evident that, in the absence of background, a single detected photon suffices to prove the presence of a fluorophore at the coordinate targeted by the donut zero. There as well, the emitting fluorophore is perfectly localized by the photons injected by the STED beam.

The minimum localization precision achievable with an unbiased estimator, i.e. the Cramér-Rao lower bound (CRLB) for localization of a fluorophore located within the region of diameter L outlined by the targeted coordinate pattern, is given by $\sigma \geq L/(4\sqrt{N})$, with N denoting the sum of photons detected with the zero placed at the coordinates of the targeted coordinate pattern. While the dependence on the diameter L of the targeted coordinate pattern is linear, the dependence on the number of detected photons N merely follows the well-known inverse square-root relation. Therefore, bringing the zero of the excitation donut closer to the fluorophore position, i.e. a controlled reduction of the diameter L of the targeted coordinate pattern, increases the localization precision more effectively than waiting for larger numbers N of detected photons. This fundamental fact is at the heart of the iterative MINFLUX approach, which plays out the central idea of bringing the zero of the donut to spatial coincidence with the probed fluorophore, a procedure only limited by background noise. For the general case of a targeted coordinate pattern comprising a set of outer triangular plus central probing points, a successive zooming-in on the molecule with a stepwise-reduced $L_k$, with $L_k$ chosen to be three times $\sigma_{k-1}$, i.e. the uncertainty in the previous iteration, is a workable strategy for refining the position estimate. After small numbers k of iterations, and therefore for a combined $N_t = k \cdot N$ of detected photons in the case of identical or similar photon counts per iteration, the CRLB becomes:

$$\sigma_k \geq \frac{L_k}{4\sqrt{N}} = \frac{3 \cdot \sigma_{k-1}}{4\sqrt{N}} = \frac{3 \cdot L_{k-1}}{(4\sqrt{N})^2} = \ldots = \frac{3^{k-1}}{(4\sqrt{N})^k} L_1 \propto k^{\frac{k}{2}} \frac{L_1}{N_t^{\frac{k}{2}}}. \quad (1)$$

Already four steps, i.e. k=4, yield $\sigma_4 \propto 1/N_t^2$, i.e. an inverse quadratic as opposed to an inverse square-root dependence on the number of detected photons $N_t$. More iterations readily yield an even higher order, reflecting an exponential relationship. Crucially as well, the numbers of photons collected in each iteration need not be identical. Rather, they may be individually adjusted for their most efficient expenditure in the iterative procedure.

Sample optimization for MINFLUX measurements typically revolves around finding the right imaging conditions for the sample, e.g. laser powers or buffer composition, which is usually done by consecutive measurements with adapted parameters. To facilitate this routine and generally improve sample throughput, instant rendering of final localization data during a measurement is highly desirable, as it allows to judge the quality of the sample already shortly after the measurement has begun.

One possible modality for superresolving imaging makes use of iterative MINFLUX imaging with power ramping. This approach derives the position of an emitter in a sample from the photon counts measured at a set of probe positions by applying a stochastic estimator to the data. The approach is complicated by the fact that in order to arrive at an unbiased result, i.e. a result without a systematic error, specific experimental conditions must be considered, such as the spatial intensity distribution of the donut and the signal-to-noise ratio. So far, these conditions have been taken into account by time-consuming post-processing of the localization data.

SUMMARY OF THE INVENTION

The invention is as set out in the appended independent claims. Advantageous refinements are defined in the dependent claims.

According to a first aspect, a method for adapting an estimator for use in a microscope for estimating a position of an emitter in a sample based on a method, in which the sample is illuminated with light at one or more sets of probe positions and fluorescence photons are acquired for the sets of probe positions, comprises:
  illuminating the sample with light at one or more sets of probe positions;
  acquiring fluorescence photons for the sets of probe positions;
  adding photon counts of the acquired photons to vectors of photon counts or sums of photon counts for the sets of probe positions;
  determining a value representative of background noise from the vectors of photon counts or the sums of photon counts; and
  adapting the estimator in real-time using the value representative of background noise.

By adding photon counts of the acquired photons to vectors of photon counts or sums of photon counts for the sets of probe positions, vectors of photon counts or sums of photon counts are determined for the sets of probe positions from the acquired photons.

Accordingly, a computer program comprises instructions, which, when executed by at least one processor, cause the at least one processor to perform the following steps for adapting an estimator for use in a microscope for estimating a position of an emitter in a sample based on a method, in which the sample is illuminated with light at one or more sets of probe positions and fluorescence photons are acquired for the sets of probe positions:
  illuminating the sample with light at one or more sets of probe positions;
  acquiring fluorescence photons for the sets of probe positions;
  adding photon counts of the acquired photons to vectors of photon counts or sums of photon counts for the sets of probe positions;
  determining a value representative of background noise from the vectors of photon counts or the sums of photon counts; and
  adapting the estimator in real-time using the value representative of background noise.

The term computer has to be understood broadly. In particular, it also includes embedded devices, workstations, parallel computation means, such as field-programmable gate arrays (FPGA), and processor-based data processing devices.

The computer program code can, for example, be made available for electronic retrieval or stored on a computer-readable storage medium.

According to another aspect, an apparatus for adapting an estimator for use in a microscope for estimating a position of an emitter in a sample based on a method, in which the sample is illuminated with light at one or more sets of probe positions and fluorescence photons are acquired for the sets of probe positions, comprises:
  illumination means configured to illuminate the sample with light at one or more sets of probe positions;
  acquisition means configured to acquire fluorescence photons for the sets of probe positions;
  processing means configured to add photon counts of the acquired photons to vectors of photon counts or sums of photon counts for the sets of probe positions, and to determine a value representative of background noise from the vectors of photon counts or the sums of photon counts; and
  control means configured to adapt the estimator in real-time using the value representative of background noise.

By being configured to add photon counts of the acquired photons to vectors of photon counts or sums of photon counts for the sets of probe positions, the processing means are configured to determine vectors of photon counts or sums of photon counts for the sets of probe positions from the acquired photons.

According to the invention, the estimator is adapted in real-time to compensate for background noise. In this way, virtually unbiased localization in real-time is enabled. For adapting the estimator, the background is estimated from the measured data and is used for removing a bias of the estimator. The real-time adaptation of the estimator enables rendering of final localization data already during a measurement, i.e. an image is already provided to the user during the measurement. This allows to judge the quality of the sample already shortly after the measurement has begun, which facilitates the routine of sample optimization and generally improves sample throughput. In addition, in the case of an iterative MINFLUX approach, betters use is made of the available photons, as the successive zooming-in of the probing points on the molecule is unbiased. A further advantage is that also during tracking of a molecule there is no bias.

Of course, use of the invention is not limited to iterative MINFLUX. The background compensation in real-time also works when simply using a pattern. As such, the solution according to the invention also works during tracking, where the pattern is tracked. Also during tracking, the radius of the pattern can be adjusted. Here, however, the adjustment is made to the speed. If several localizations are close to each other, the radius can be reduced. If the localizations shift, the radius is increased.

In an advantageous embodiment, for determining a value representative of background noise only sets of probe positions are evaluated, for which no fluorescence from an emitter is detected. This approach has the advantage that the estimation of background noise is not distorted by photons that actually stem from fluorescence from an emitter. In this way, a more accurate background estimation is achieved.

In an advantageous embodiment, for determining whether fluorescence from an emitter is detected, the sum of photon counts for a set of probe positions is compared with a threshold derived from a current estimated background. For example, the threshold may be a sum of the current estimated background and a preset threshold or a product of the current estimated background and a preset constant larger than 1. In this way, the sum of photon counts for a set of probe positions is only classified as a signal in case the sum deviates significantly from the current estimated background. The current estimated background may also be computed as a sliding average of background estimates from previous probe positions.

In an advantageous embodiment, the sums of photon counts are added to a histogram. Using histograms, e.g. running histograms that are built from a limited number of entries in a first-in-first-out manner, has the advantage that a history of measurements can be evaluated in an easy way.

In an advantageous embodiment, the histogram is specific for each of a plurality of scanning iterations. In an iterative MINFLUX approach, the size of the set of probe positions is reduced for successive iterations. At the same time, the intensity is increased, as the fluorophore now is located closer to the minimum of the excitation donut. In general, the dependency of the background noise from the intensity is nonlinear. Therefore, it is advantageous to separately determine a value representative of the background noise for each intensity that is used. In case of a linear dependency, a single estimation is sufficient.

In an advantageous embodiment, the value representative of background noise is derived from a peak of the histogram. Deriving the value representative of background noise from a peak of a histogram can be easily implemented. For example, the absolute maximum of a histogram can be used, which is a computationally inexpensive choice. Alternatively, peak-detection algorithms may be applied. For example, the value representative of background noise may be derived as the highest peak or as the first peak from a copy of the histogram after smoothing it with a Gaussian kernel. As an alternative, the value may be derived from the position of the peak that contains the most entries in total.

In an advantageous embodiment, the estimator is adapted in such a way that an expectancy value of the background noise is subtracted from photon counts before estimating a position of an emitter. Typical estimators deliver an expectancy value for the position of an emitter. This expectancy value may be influenced by background noise. By subtracting an expectancy value of the background noise from photon counts before estimating a position of an emitter, a more reliable expectancy value for the position of the emitter is obtained.

In an advantageous embodiment, the estimator uses a calibration polynomial, which is specific for each scanning iteration. For example, a calibration polynomial of second degree may be used. Using a calibration polynomial has the advantage that a calibration polynomial is inexpensive to compute on the microscope hardware. Optimized parameters for the polynomial may be obtained, for example, by a Monte Carlo simulation that accounts for the known experimental parameters. The calibration polynomial may likewise be provided as a look-up table.

In an advantageous embodiment, the sets of probe positions are illuminated multiple times. This ensures that a time-fluctuating background signal is effectively probed at all probe positions, to mitigate a directional distortion that would occur if a short burst of background would concentrate into a subset of the probe positions.

In an advantageous embodiment, a set of probe positions comprises three or more probe positions, which are arranged rotationally symmetric on a circle. The aim of the measurements is to infer the position of the fluorophore from the set of measurement data for a set of probe positions in the simplest possible way. At least for real-time background estimation, the set of probe positions does not use a central probe position, but only probe positions that are arranged rotationally symmetric around the center. In other words, each probe position can be mapped to a different probe position by rotating it around the center. Of course, this does not exclude the possibility that additional probe positions may be measured, in which case the resulting information is used additionally. For example, a measurement can be made in the center to check the plausibility of the measurement.

A pattern comprising three or more probe positions, which are arranged rotationally symmetric on a circle, has the property that any reasonable estimator delivers an expectancy value, which depends only on the position of the emitter and is independent of a non-location-dependent background noise. This is because every reasonable estimator basically determines a center of gravity of the measured values. This center of gravity does not change if a fixed value is added to all the measurements. However, the center of gravity is determined from a vector sum of the individual measured values. This vector sum must be normalized in the noise-free case with respect to the sum of the measured values. If background noise is now added, the expectancy value of the vector sum in the enumerator does not change, but the expectancy value of the sum increases by the expectancy value of the background noise that is recorded for the probe positions during the total measurement time. In order make the expectancy value of the position estimate independent of the background noise, the expectancy value of the background noise is hence subtracted in the denominator.

In the state of the art, a pattern is preferably used for estimation, which also has a probe position in the center. Such an estimation leads to a change in the expectancy value when background noise is added. However, with a prior art estimator it is not possible to simply subtract the background noise. In the case of an estimator with a probe position in the center, at least the value measured for this center position would have to be corrected with respect to the background noise in order to eliminate the background noise. Unfortunately, in the center the least photons of the signal are expected, i.e. the relation between signal and background is extremely unfavorable. If the emitter were exactly in the center, the signal would actually be zero. If the average noise were now subtracted from zero, negative values would be obtained. This would cause severe problems. Setting the signal in the center to zero, if otherwise negative, is likewise not possible. Therefore, in the state of the art optimum coefficients of correction functions are determined for each ratio of signal and background, whereas the measured photon counts as such are not corrected. In other words, a correction function needs to be determined, which has the ratio of signal and background as a parameter.

Using the solution according to the present invention, the ratio of signal and background can be determined in real-time. For this purpose, the average signal value reduced by the background estimated in real-time is determined, i.e. the correspondingly corrected sum of the individual measured values. The ratio is the sought-after signal/background ratio. Subsequently, the correct correction function can be selected or the determined signal/background ratio is used as parameter of the overall correction function.

In an advantageous embodiment, opposing probe positions of a set of probe positions are illuminated in sequential pairs. This approach further supports the prevention of a directional distortion that would occur if a short burst of background would concentrate into a subset of the probe positions. Each pair of probe positions together with the center of the set of probe positions defines an angle, where the probe positions are located on the legs and the center is located on the vertex. For an even number of probe positions, opposing probe positions are those where the angle is 180°. For an odd number of probe positions, opposing probe positions are those where the angle is closest to 180°.

In an advantageous embodiment, the estimator is a least-mean-squared estimator. Least-mean-squared estimators are very robust against background noise and are well suited for use in MINFLUX localization. Of course, also other types of estimators may be used, e.g. maximum likelihood estimator or other estimators known to the skilled person.

According to one aspect of the invention, which can be used in conjunction with, but also independent of the above described background estimation, an improved localization mode is implemented, named pinhole orbit scanning. In particular, a method for localizing an emitter in a sample comprises:
- illuminating the sample with a stationary donut-shaped excitation beam;
- projecting a pinhole sequentially to probe positions of a targeted coordinate pattern;
- acquiring fluorescence photons for the probe positions; and
- estimating a position of the emitter in the sample from the acquired fluorescence photons.

Accordingly, a computer program comprises instructions, which, when executed by at least one processor, cause the at least one processor to perform the following steps for localizing an emitter in a sample:
- illuminating the sample with a stationary donut-shaped excitation beam;
- projecting a pinhole sequentially to probe positions of a targeted coordinate pattern;
- acquiring fluorescence photons for the probe positions; and
- estimating a position of the emitter in the sample from the acquired fluorescence photons.

As before, the term computer has to be understood broadly. In particular, it also includes embedded devices, workstations, parallel computation means, such as field-programmable gate arrays, and processor-based data processing devices.

The computer program code can, for example, be made available for electronic retrieval or stored on a computer-readable storage medium.

Similarly, an apparatus for localizing an emitter in a sample comprises:
- illumination means configured to illuminate the sample with a stationary donut-shaped excitation beam;
- projections means configured to project a pinhole sequentially to probe positions of a targeted coordinate pattern;
- acquisition means configured to acquire fluorescence photons for the probe positions; and
- processing means configured to estimate a position of the emitter in the sample from the acquired fluorescence photons.

The described solution has the advantage that it improves the efficiency of the search process. Contrary to such used in previous MINFLUX implementations, this pre-localization does not resort to a regularly focused beam. This significantly simplifies the setup, as it makes dedicated hardware for microsecond-scale switching between different focal intensity distributions, e.g. between a Gaussian shape and a donut shape, redundant. The spatial light modulators that are typically used for switching between a Gaussian shape and a donut shape are usually too slow to switch between the shapes during a measurement routine. While the catch range depends on several parameters, the donut shape facilitates the catch range to be extended beyond that of a Gaussian shape. In other words, every emitter located within the potential well can be found.

In an advantageous embodiment, the excitation beam is kept stationary using galvanometric and electro-optical scanners that act in concert. This has the advantage that a rather large field of view is achieved.

In an advantageous embodiment, a mutual distance between scanning positions is between 10% and 50% of an excitation wavelength that is used. This prevents dark spots next to positions of a search grid that potentially arise from the donut zero.

BRIEF DESCRIPTION OF THE DRAWINGS

Further features of the present invention will become apparent from the following description and the appended claims in conjunction with the figures.

DETAILED DESCRIPTION OF PREFERRED EMBODIMENTS

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
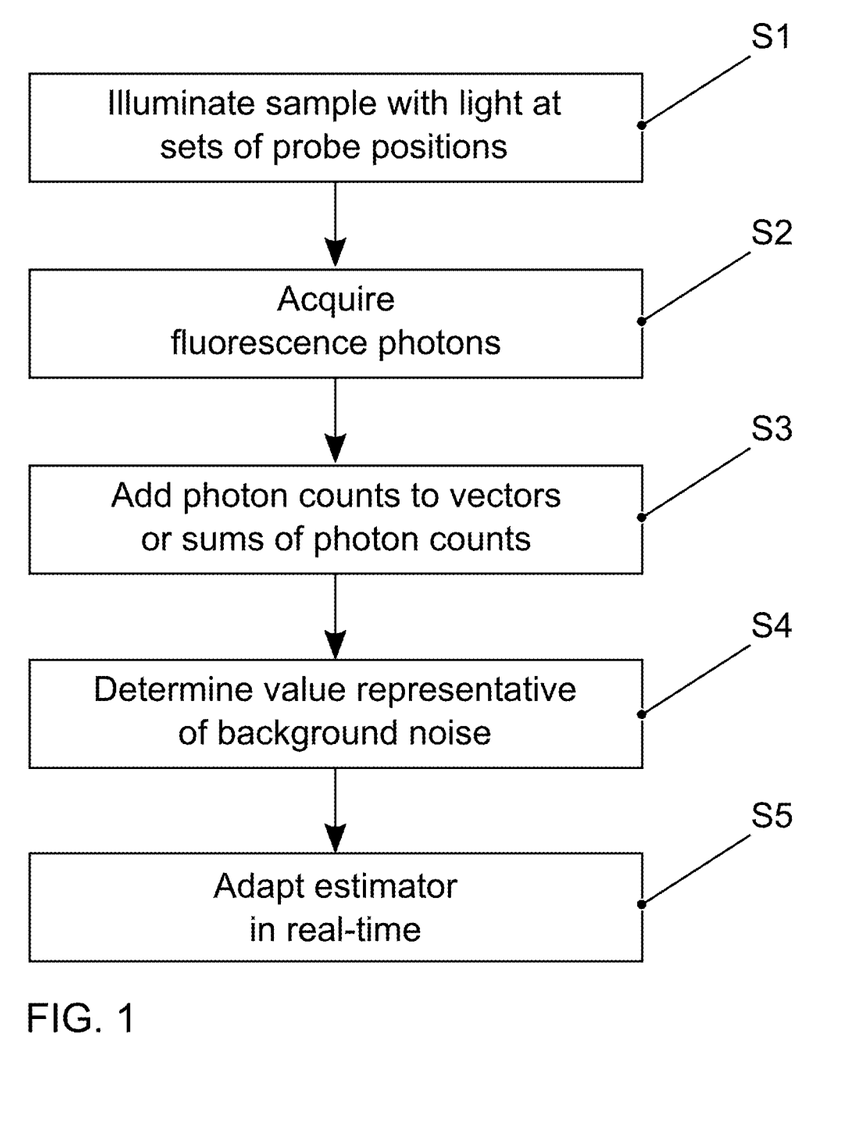
FIG. 1 schematically illustrates a method for adapting an estimator for use in a microscope for estimating a position of an emitter in a sample.

FIG. 1 schematically illustrates a method according to the invention for adapting an estimator for use in a microscope for estimating a position of an emitter in a sample. For example, the estimator may be a least-mean-squared estimator. In this method, the sample is illuminated S1 with light at one or more sets of probe positions and fluorescence photons are acquired S2 for the sets of probe positions. Advantageously, the sets of probe positions are illuminated S1 multiple times. Opposing probe positions of a set of probe positions may be illuminated S1 in sequential pairs. Preferably, a set of probe positions comprises three or more probe positions, which are arranged rotationally symmetric on a circle. Photon counts of the acquired S2 photons are then added S3 to vectors of photon counts or sums of photon counts for the sets of probe positions. Subsequently, a value representative of background noise is determined S4 from the vectors of photon counts or the sums of photon counts. For example, the sums of photon counts may be added to a histogram, which preferably is specific for each of a plurality of scanning iterations. The value representative of background noise can then be derived from a peak of a histogram. The value representative of background noise is used for adapting S5 the estimator in real-time. For example, the estimator may be adapted S5 in such way that an expectancy value of the background noise is subtracted from photon counts before estimating a position of an emitter. Preferably, the estimator uses a calibration polynomial, which is specific for each scanning iteration. Advantageously, for determining a value representative of background noise only sets of probe positions are evaluated, for which no fluorescence from an emitter is detected. For determining whether fluorescence from an emitter is detected, the sum of photon counts for a set of probe positions may be compared with a threshold derived from a current estimated background.

Figure 2:
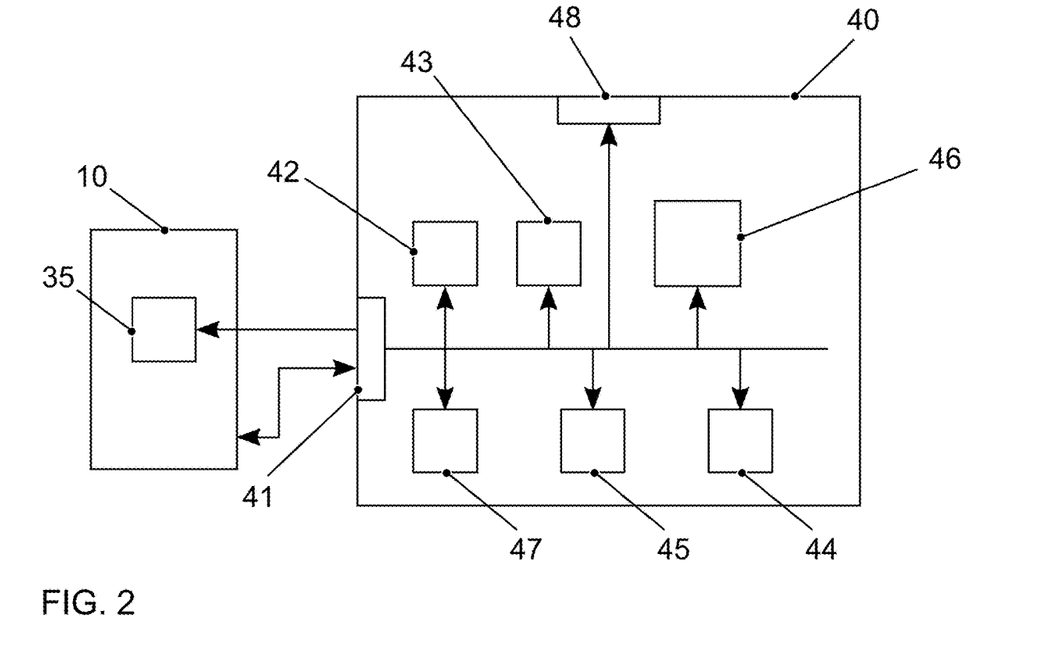
FIG. 2 schematically illustrates a first embodiment of an apparatus for adapting an estimator for use in a microscope for estimating a position of an emitter in a sample.

FIG. 2 schematically illustrates a block diagram of a first embodiment of an apparatus 40 according to the invention for adapting an estimator 35 for use in a microscope 10 for estimating a position of an emitter in a sample. For example, the estimator 35 may be a least-mean-squared estimator. The apparatus 40 has an interface 41 for exchanging data with components of the microscope 10. An illumination means 42 is configured to illuminate the sample with light at one or more sets of probe positions, e.g. by instructing a light source and position control elements of the microscope accordingly. Advantageously, the sets of probe positions are illuminated S1 multiple times. Opposing probe positions of a set of probe positions may be illuminated S1 in sequential pairs. Preferably, a set of probe positions comprises three or more probe positions, which are arranged rotationally symmetric on a circle. An acquisition means 43 is configured to acquire fluorescence photons for the sets of probe positions, e.g. by evaluating signals of one or more detectors of the microscope. A processing means 44 is configured to add photon counts of the acquired photons to vectors of photon counts or sums of photon counts for the sets of probe positions, and to determine a value representative of background noise from the vectors of photon counts or the sums of photon counts. For example, the sums of photon counts may be added to a histogram, which preferably is specific for each of a plurality of scanning iterations. A control means 45 is configured to adapt the estimator 35 in real-time using the value representative of background noise. For example, the estimator may be adapted in such way that an expectancy value of the background noise is subtracted from photon counts before estimating a position of an emitter. Preferably, the estimator uses a calibration polynomial, which is specific for each scanning iteration. Advantageously, for determining a value representative of background noise only sets of probe positions are evaluated, for which no fluorescence from an emitter is detected. For determining whether fluorescence from an emitter is detected, the sum of photon counts for a set of probe positions may be compared with a threshold derived from a current estimated background.

The illumination means 42, the acquisition means 43, the processing means 44, and the control means 45 may be controlled by a controller 46. A local storage unit 47 is provided, e.g. for storing data during processing. A user interface 48 may be provided for enabling a user to modify settings of the various elements 42-46 of the apparatus 40. The different elements 42-46 of the apparatus 40 can be embodied as dedicated hardware units. Of course, they may likewise be fully or partially combined into a single unit or implemented as software running on a processor, e.g. a CPU or a GPU.

Figure 3:
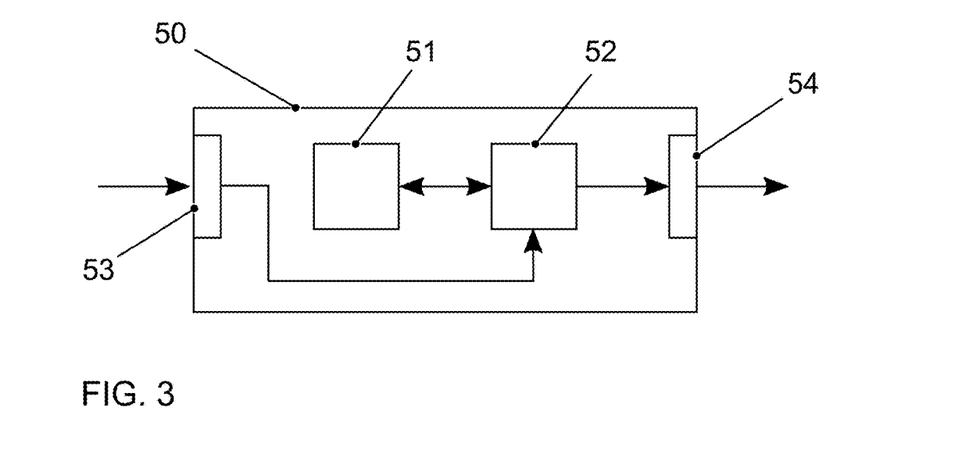
FIG. 3 schematically illustrates a second embodiment of an apparatus for adapting an estimator for use in a microscope for estimating a position of an emitter in a sample.

A block diagram of a second embodiment of an apparatus 50 according to the invention for adapting an estimator for use in a microscope for estimating a position of an emitter in a sample is illustrated in FIG. 3. The apparatus 50 comprises a processing device 51 and a memory device 52. For example, the apparatus 50 may be a computer, an electronic control unit or an embedded system. The memory device 52 has stored instructions that, when executed by the processing device 51, cause the apparatus 50 to perform steps according to one of the described methods. The instructions stored in the memory device 52 thus tangibly embody a program of instructions executable by the processing device 51 to perform program steps as described herein according to the present principles. The apparatus 50 has an input 53 for receiving data. Data generated by the processing device 51 are made available via an output 54. In addition, such data may be stored in the memory device 52. The input 53 and the output 54 may be combined into a single bidirectional interface.

The processing device 51 as used herein may include one or more processing units, such as microprocessors, digital signal processors, or a combination thereof.

The local storage unit 47 and the memory device 52 may include volatile and/or non-volatile memory regions and storage devices such as hard disk drives, optical drives, and/or solid-state memories.

In the following, aspects of the invention shall be explained in more detail with reference to FIG. 4 to FIG. 9.

Figure 4:
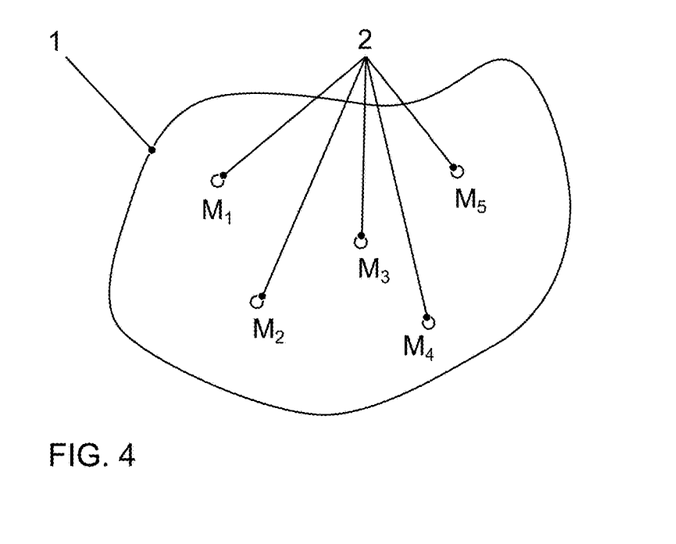
FIG. 4 shows a sample with a number of molecules.

FIG. 4 shows a sample 1 with a number of emitters 2, e.g. molecules marked with fluorophores or acting as fluorophores themselves. In this example, five emitters 2 are shown, whose positions $M_1$ to $M_5$ are to be determined. The fluorophores can be excited with light of a suitable wavelength to emit photons. In MINFLUX microscopy, the fluorophores are excited in such a way that a fluorophore to be localized is always placed close to or in a minimum of a light distribution used for excitation, whereby the light distribution must have an intensity increase range adjacent to the minimum. In this way a better utilization of the fluorescence photons is achieved with regard to obtaining information about the position of the respective emitting fluorophore. Ideally, the minimum of the excitation light distribution is a zero point.

Figure 5:
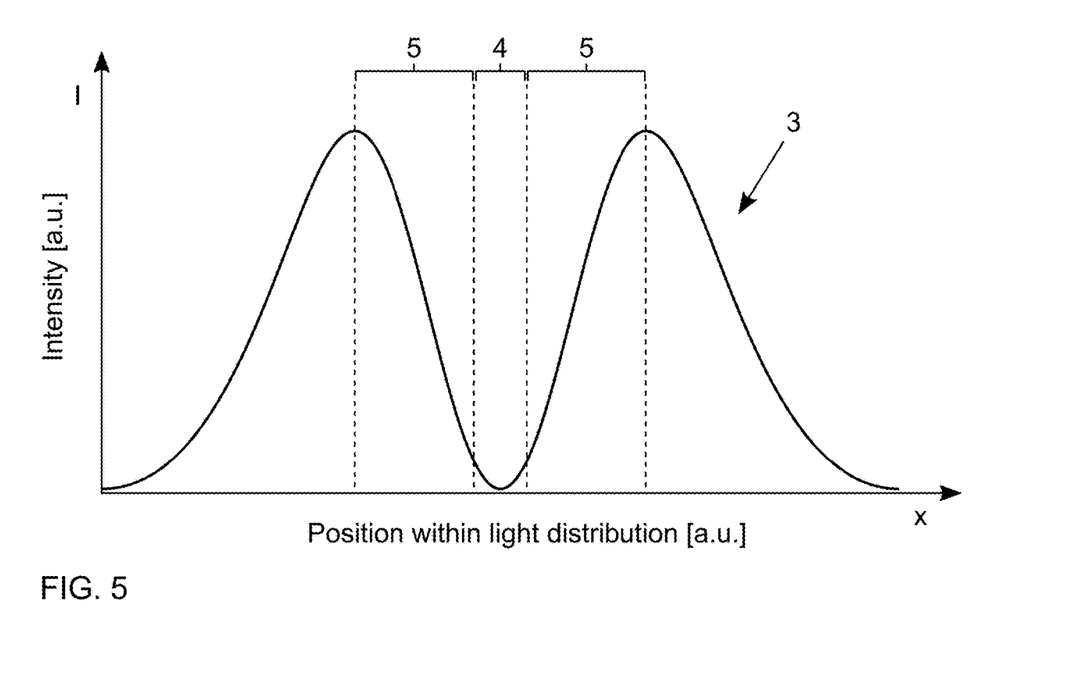
FIG. 5 shows an exemplary intensity curve over a cross-section through a light distribution.

FIG. 5 shows an exemplary intensity curve over a cross-section through a light distribution 3 of a suitable structured optical beam, in this case a donut. The intensity I is plotted against the position within the light distribution 3, here along the x-axis. The intensity curve of the light distribution 3 shows a central intensity minimum 4, which is surrounded on all sides by intensity increase areas 5.

Figure 6:
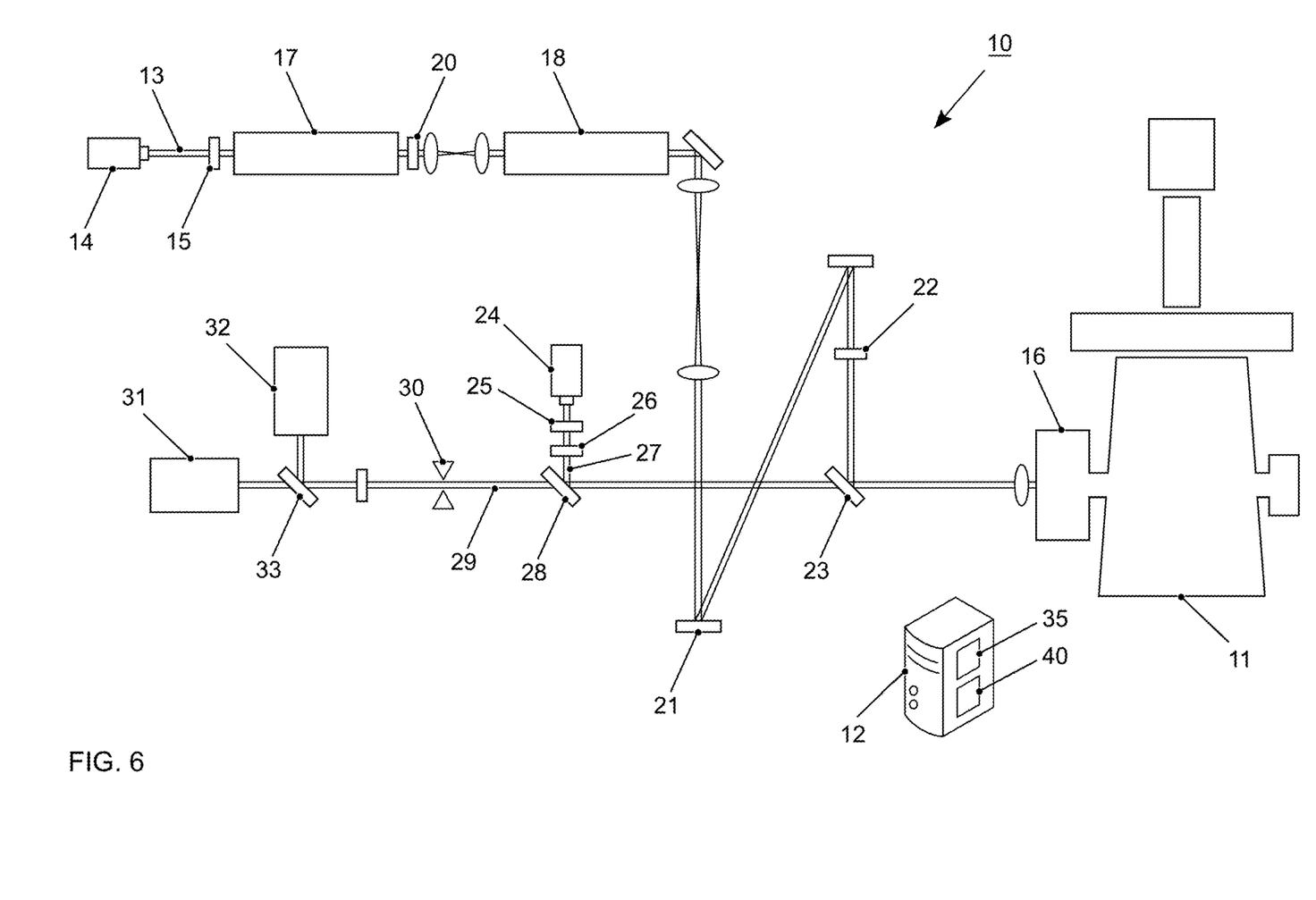
FIG. 6 shows an exemplary optical setup of a MINFLUX microscope.

FIG. 6 shows an exemplary optical setup of a MINFLUX microscope 10. The optical setup is based on a common fluorescence microscope. Typical microscopy workflows also entail prior steps before a nanometer resolution image is recorded, in particular the selection of regions of interest based on eyepiece inspection of a sample in the widefield mode or by confocal scanning. Realizing MINFLUX on top of a standard inverted microscope platform 11 facilitates the combination of practicability with ultimate resolution, as a common fluorescence microscope provides routinely needed features such as compatibility with standard stages, probe holders, bright field and epi-fluorescence illumination with employable filters and eyepieces for quickly checking large regions of interest in the sample. The MINFLUX microscope 10 is controlled by controller 12.

An excitation beam 13 emitted by a laser 14 is focused into the focal plane of an objective lens, which is part of the microscope platform 11. In order to allow both flexible pre-views of large regions of interest and precise measurements in desired regions applying the MINFLUX scheme, beam scanning with respect to the stationary sample is achieved by a galvanometer scanning unit 16 and electro-optical beam deflectors 17, 18 operating in concert. To enable lateral fast scanning for MINFLUX measurements in the x-y-plane, the excitation beam 13 passes through a λ/2-plate 15 and is deflected by two electro-optical beam deflectors 17, 18, which are installed in series and rotated by 90° relative to their respective axes. A λ/2-plate 20 in between the electro-optical beam deflectors 17, 18 rotates the laser beam polarization by 90° to accommodate for that rotation. The accessible field of view of the deflector array in the focal plane is small and is extended via an additional galvanometer scanning unit 16 installed at the camera port of the microscope body, which serves as the coarser basis for additional finer and much faster electro-optic x- and y-displacements. To switch between a Gaussian shape of the excitation beam 13 and a donut shape, a phase-modulating spatial light modulator 21 is used, which introduces a helical phase shift onto the beam 13. Following that, a λ/4-plate 22 shapes a circular polarization of the excitation light. Subsequently, the excitation beam 13 is superimposed with the detection beam path with a beam splitter 23 and steered into the microscope 11 via the galvanometer scanning unit 16. Jointly, both the galvanometer scanning unit 16 and the electro-optical beam deflectors 17, 18 are used to position the excitation beam 13 in the microscope 11, either as a normally focused beam for confocal scanning, or as a donut with a central zero-point intensity for the MINFLUX protocol.

For activation of single fluorophores, an activation laser 24 is used. The intensity of this laser 24 is reduced into the nanowatts region by a neutral-density filter 25. After passing through a λ/4 plate 26, the activation laser beam 27 is superimposed with the detection laser beam path as well as the excitation laser beam path by means of a beam splitter 28. The activation laser beam 27 is provided to the microscope 11 without passing the electro-optical beam deflectors 17,18

Fluorescence light 29 emitted by the sample is collected by the objective lens, descanned by the galvanometer scanning unit 16, transmitted by the aforementioned beam splitters 23, 28 and passed to a variable pinhole 30 for confocalized detection using two avalanche photodiodes 31, 32, which detect photons in distinct spectral ranges defined by a dichroic mirror 33.

In order to estimate positions of the emitters in the sample, the controller 12 comprises an estimator 35. The estimator 35 can be adapted in real-time by an apparatus 40 according to the invention for adapting the estimator 35. In this example, the apparatus 40 is also included in the controller 12. Of course, it may likewise be provided as a self-contained apparatus.

As indicated before, one possible modality for superresolving imaging is to use iterative MINFLUX imaging with power ramping. This approach derives the position of an emitter in a sample from the photon counts measured at a set of probe positions by applying a stochastic estimator to the data. In order to arrive at an unbiased result, i.e. a result without a systematic error, a measuring scheme is used, which offers virtually unbiased localization in real-time.

For a targeted coordinate pattern with m beam positions $\vec{b}_j$ (j=1 ... m) on a circle with radius L and associated photon counts $p_j$ collected during equal dwell times, a least-mean-squared estimator (LMSE) for the (relative) emitter position u within the targeted coordinate pattern can be written as the product $$\vec{r}(p_j) = c(L, w) \cdot \vec{u}(p_j, \vec{b}_j) \tag{2}$$

of a normalized vector sum $$\vec{u}(p_j, \vec{b}_j) = \frac{\sum_{j=1}^{m} p_j \cdot \vec{b}_j}{\sum_{j=1}^{m} p_j} \tag{3}$$

with a scaling constant c that accounts for L and the full-width-half-maximum (FWHM) w of the point spread function. According to one aspect of the present invention, the scaling constant c is replaced with an iteration dependent calibration polynomial $P_k$ of second degree, which is inexpensive to compute on the microscope hardware, to obtain an unbiased emitter position from the calibrated least-mean-squared estimator:

$$\vec{r}(\vec{u}) = \vec{u} \cdot P_k(|\vec{u}|^2) \quad (4)$$

For each iteration k, optimized coefficients for $P_k$ may be obtained by a Monte Carlo simulation that accounts for the known experimental parameters such as the precise shape of the donut, the geometry of the targeted coordinate pattern and the photon limit $N_k$. Preferably, the microscope probes at the targeted coordinate pattern multiple times during each localization step until the actual number of collected photons surpassed the preset $N_k$. The dwell times and the excitation powers may be adjusted such that the distribution of the actual number of collected photons stays close enough to this limit to warrant the use of $P_k$. For m=3 off-center beam positions as used in previous MINFLUX implementations, the estimator bias significantly deviates from radial symmetry. Therefore, m is preferably increased to 6 for all iterations. An exception may be made for iterations where the aim are highest localization rates and the added overhead should be avoided. The increased angular uniformity of the localization precision becomes noteworthy in particular for emitters that reside at the periphery of the targeted coordinate pattern.

In providing the unbiased emitter position, equation (4) does not, however, account for the inevitable background that is present in typical applications. A uniform background would introduce a bias towards the center of the targeted coordinate pattern, as its mean contribution to the numerator of u would amount to 0, while the denominator would now overestimate the number of photons that came from the localized emitter. Based on this notion, a MINFLUX control logic with a real-time background estimation algorithm is used to mitigate sufficiently homogeneous, quasi-static background.

Figure 7:
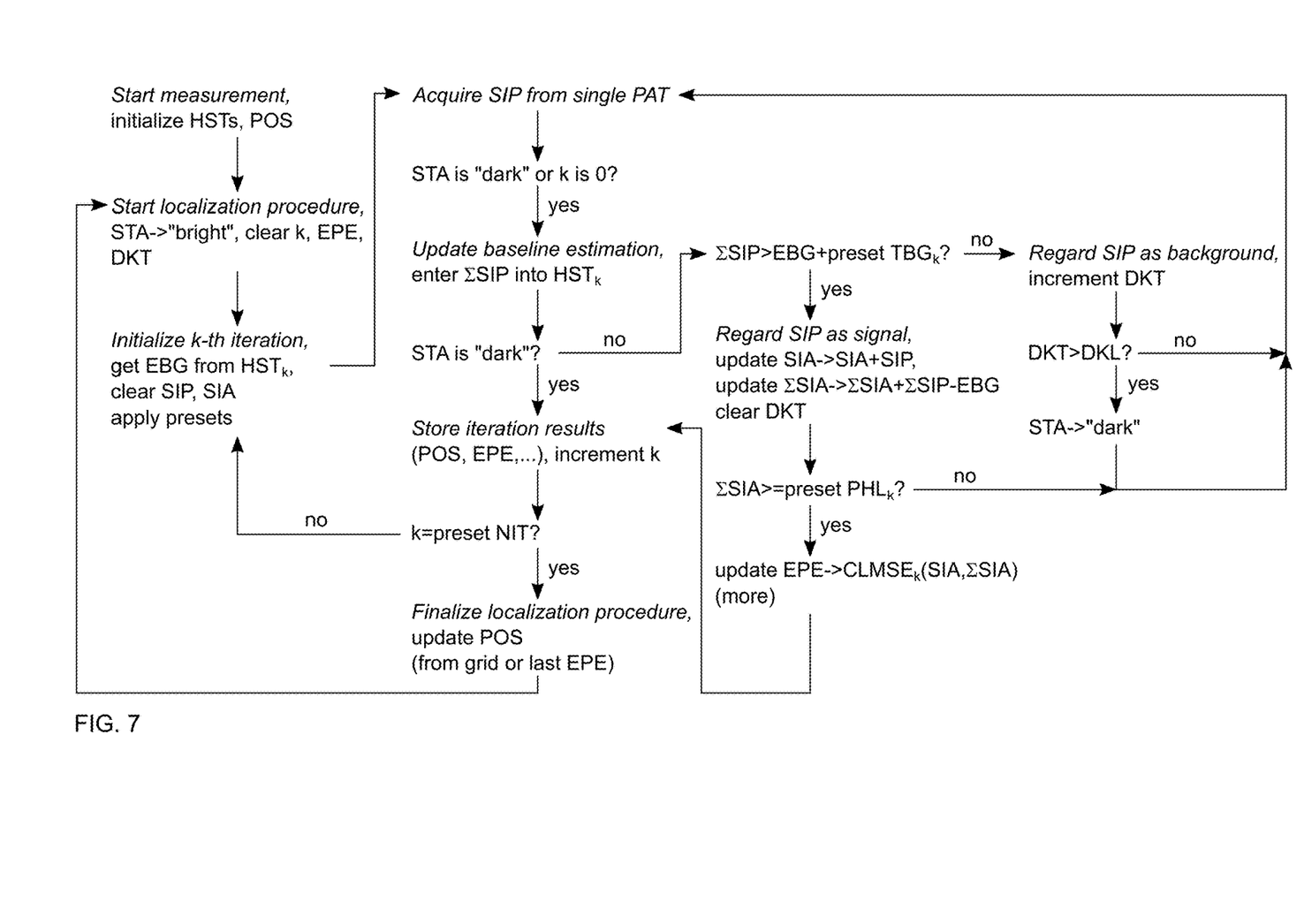
FIG. 7 illustrates the principle of real-time background compensation.
Figure 8:
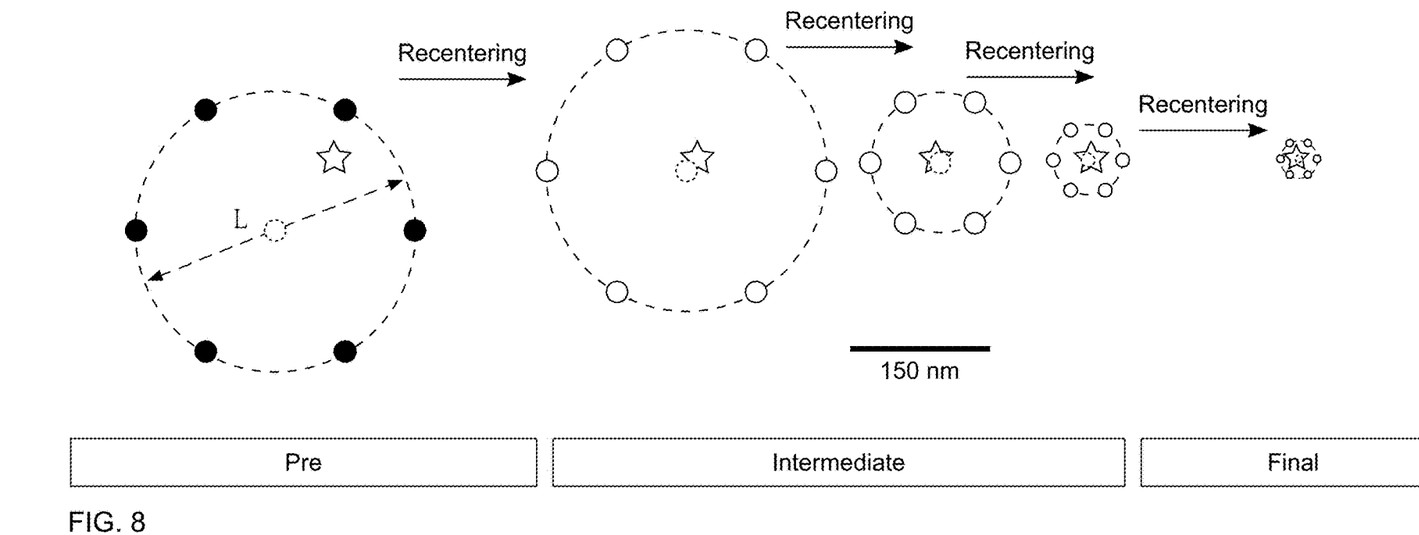
FIG. 8 illustrates the principle of MINFLUX localization.

The implementation of the algorithm is depicted in FIG. 7. The current fluorescence baseline per iteration is deduced from a running histogram of detected fluorescence intensity during localization. Variables with index k are iteration specific, where k is the current iteration, starting at 0. NIT indicates the number of iterations in the MINFLUX sequence. $TCP_k$ refers to the targeted coordinate pattern, i.e. the relative coordinates of the probe positions. EPE is the emitter position estimate relative to POS, i.e. the measurement position in the sample, which is the origin of the TCP. POS is also the starting emitter position estimate. SIP refers to the last signal from pattern, which is a vector of photon counts. ΣSIP is the total photon count of the last signal. SIA refers to the accumulated SIPs over the current iteration. Accordingly, ΣSIA is the total photon count of the current iteration over the estimated background. $PHL_k$ is a photon limit, $HST_k$ is the (running) histogram of acquired ΣSIPs. DKT refers to a dark time counter, DKL to a dark time limit. EBG is the estimated background count of a single pattern in the current iteration. $TBG_k$ refers to a background threshold. STA is the status of the measurement. If the status is "bright", the algorithm is trying to localize an emitter. If the status is "dark", the algorithm is estimating background. $CLMSE_k$ refers to the calibrated least mean square estimator.

The implementation uses a vector "signal from pattern" SIP=$(p_1, \ldots, p_m)$ of photon counts that were acquired during a single probing of the targeted coordinate pattern as the smallest unit of data on which decisions are based. For a single SIP probing, every $\vec{b}_j$ needs to be addressed at least once. However, typically the targeted coordinate pattern is scanned multiple times during a single SIP acquisition to ensure that a time-fluctuating background signal is effectively probed at all $\vec{b}_j$, to mitigate a directional distortion that would occur if a short burst of background would concentrate into a subset of the $\vec{b}_j$. For the same reason, it is beneficial to choose the scan order such that opposing $\vec{b}_j$ are probed in sequential pairs.

To estimate the background, a histogram-type baseline estimation is used. For each MINFLUX iteration k, record is kept of the number of photons ΣSIP=$\Sigma_{j=1}^{m} p_j$ that have been collected during each individual SIP by entering every measured ΣSIP into an iteration specific, running histogram $HST_k$. A running histogram is a histogram that is built from a limited number of entries in a first-in-first-out manner. While a region of interest is scanned in search for fluorescing emitters, the microscope acquires 0-th iteration SIPs at different locations in the sample, until a fluorescent signal is detected. The imaging conditions, e.g. activation levels, etc., are chosen such that during this process, most of the non-background emitters are in their dark state. Therefore, most of the acquired SIPs in 0-th iteration contain background-only signal. For higher iterations k>0, the corresponding histograms $HST_k$ are built from only those SIPs that were measured after the measurement status changed to "dark", i.e. no significant signal above background has been detected. Consequently, all histograms will, iteration specifically, develop a maximum at a value EBG of ΣSIP that is an estimate for the current, averaged background level.

During each MINFLUX iteration, one or more SIPs are acquired until enough photons are acquired to proceed with the localization. During this process, an emitter that is currently being localized, i.e. the current emitter, may emit fluorescence intermittently in (micro-)bursts, a property well known for fluorescent proteins, and may cease to emit at any time. To allow only those SIPs to contribute to the localization that have a high probability of carrying signal from the current emitter, it is determined whether an individual SIP contains significant signal over background by comparing ΣSIP to the sum of the current value EBG and a threshold $TBG_k$. If the answer is yes, SIP is added to a vector SIA that holds the accumulated, vectorial signal for this iteration, which later contributes to the numerator of equation (3). For the denominator of equation (3), ΣSIP is background corrected and then added to the accumulated total signal ΣSIA→ΣSIA+ΣSIP-EBG. If the answer is no, SIP is discarded, as the current emitter apparently entered a non-fluorescing dark state. A counter DKT measures the number of consecutive SIPs that fall under this case and is now incremented by one. If the counter DKT surpasses a preset dark-time-limit DKL, which determines the longest time to wait for the current emitter to re-emit, the measurement status is set to dark. In this state, the microscope skips localization and probes a single SIP in each subsequent iteration to fill the respective histogram $HST_k$. The measurement status will return to bright, i.e. it expects signal from a current emitter, during initialization of the next localization event.

While less well-behaved background structures may require additional effort, such as multiple instances of background estimation assigned to different areas of the region of interest, it is noteworthy that already this simple approach proves efficient for the imaging tasks at hand. As a beneficial side effect, imperfections of the focusing that raise the center intensity of the donut above zero are concomitantly mitigated, since they manifest as an additional background contribution that predominantly depends on average emitter brightness and the laser power applied.

The above-described approach of using the position of the absolute maximum of a histogram $HST_k$ as the value EBG is a computationally inexpensive choice. It requires the histogram bin size to be chosen wide enough to allow the maximum to be formed, while narrow enough to prevent quantization effects from distorting the estimate. In practice, a bin size that corresponds to 5%-15% of the expected single emitter intensity represents a working tradeoff. For a higher precision of the estimate and/or less dependence on measurement parameters, methods that are more complex can be applied. For example, the bin size may be chosen to be smaller than 1% of the expected single emitter intensity. In this case, peak-detection algorithms may be applied to derive the value EBG. For example, the value EBG may be derived as the highest peak or as the first peak from a copy of the histogram after smoothing it with a Gaussian kernel. As an alternative, the value EBG may be derived from the position of the peak that contains the most entries in total, instead of most entries per bin. Of course, other density estimation methods may be used in place of histograms.

With regard to the effect and determination of the threshold $TBG_k$, a simple situation with a histogram $HST_k$ built from SIPs that contain either background, or background plus signal from emitters of interest is assumed. The histogram $HST_k$ will exhibit two peaks, which are broadened due to Poisson noise of the detected signal and variation in emitter and background brightness. Under the measurement conditions stated above, the background peak will exhibit the global maximum and its position will be the value EBG. If the background peak is approximately symmetric and the threshold $TBG_k$ is set to zero, roughly half of pure-background SIPs measured would erroneously be treated as signal from a current emitter, i.e. the would constitute false positives. If the threshold $TBG_k$ is chosen larger, more and more area of the emitter-peak will eventually fall below the threshold given by the value $EBG+TBG_k$, and the corresponding portion of measured emitter-SIPs would be discarded. Typically, the threshold $TBG_k$ can be set to 10%-50% of the expected single emitter intensity during a measurement, decreasing with iteration index. The higher threshold during the initial iteration k=0 prevents chasing background. Lower values of the threshold $TBG_k$ and, consequently, more false positives can be tolerated in higher iterations, since an emitter of interest has already been identified and the background compensation scheme mitigates the effect of false positive SIP classification with respect to mislocalization.

In practice, the usable field of view of a single MINFLUX localization step is usually limited to below half the wavelength of the excitation light that is used. To scan extended samples in a micrometer-sized region of interest, the microscope spans it with a hexagonal grid of scanning positions. The principle of an iterative MINFLUX localization is illustrated by the example shown in FIG. 8. In this example, the process starts with a pre-localization by pinhole orbit scanning, in which the pinhole is sequentially projected to the points of a hexagonal targeted coordinate pattern without a probe position at its center. Following the pre-localization by pinhole orbit scanning, the iterative procedure proceeds with three intermediate subsequent iterations and one final iteration. In the figure, the projection positions of the pinhole are indicated by the filled black circles. The black empty circles indicate the targeted coordinate pattern applied for the iterations, i.e. the donut center positions. The center position of the targeted coordinate pattern is also marked, though it is not used as a probe position. The star designates the position of the fluorophore. After each iteration, the targeted coordinate pattern is recentered according to the prior emitter position estimate from a calibrated least-mean-squared estimation based on the registered photon counts. The procedure thus quickly zooms in on the emitter, shrinking the targeted coordinate pattern to smaller dimensions of L. A precision of ~2 nm is uniformly afforded. Subsequently emitted photons may be used to further refine the position estimate until the emitter ceases to fluoresce.

Figure 9:
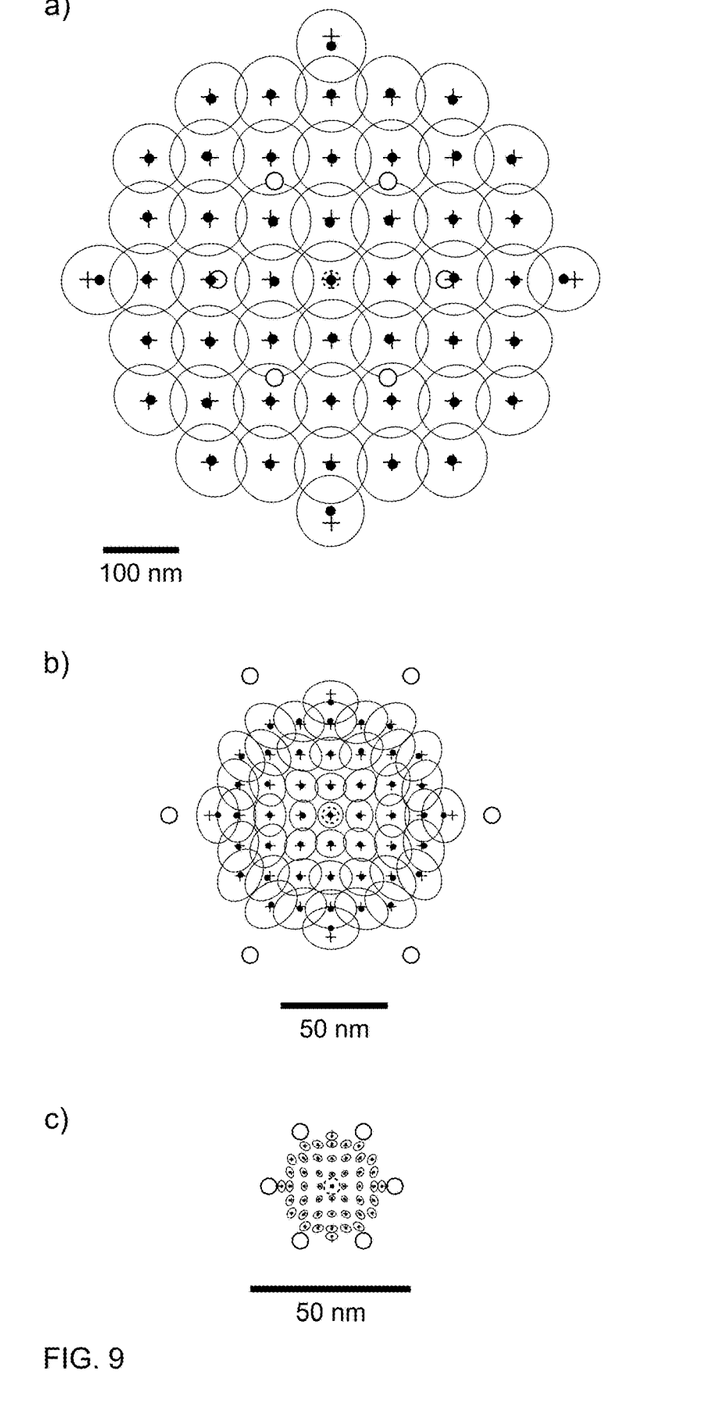
FIG. 9 shows targeted coordinate patterns applied in the MINFLUX localization process, with simulated mean position estimates and confidence intervals.

FIG. 9 shows targeted coordinate patterns applied in the MINFLUX localization process, with simulated mean position estimates and confidence intervals. The black solid circles indicate the simulated mean position estimates. The ellipsoids indicate the confidence intervals for spaced out emitter positions, which are indicated as black crosses. FIG. 9a) shows a pre-localization, FIG. 9b) an intermediate localization, and FIG. 9c) the final localization. The mutual distance d between the scanning positions preferably is between 10% and 50% of the excitation wavelength $\lambda_{exc}$ that is used, i.e. $0.1 \cdot \lambda_{exc} \leq d \leq 0.5 \cdot \lambda_{exc}$. These positions are repeatedly probed during a measurement and serve as starting points for the activation, search and localization of fluorescent markers. Since the field of view of a single MINFLUX localization step is generally limited to an area of about the size of the diffraction limit or even less, according to one aspect of the invention a lower-precision but further-reaching localization mode is implemented, named pinhole orbit scanning, which improves the efficiency of the search process. Contrary to such used in previous MINFLUX implementations, the pre-localization does not resort to a regularly focused beam. Instead, galvanometric and electro-optical scanners act in concert to keep the donut-shaped excitation beam stationary at a grid position, while the pinhole is sequentially projected to the points of a hexagonal targeted coordinate pattern, i.e. m=6, without a probe position at its center and with a beam separation of about L=300 nm. The position estimate is then obtained according to equation (4) as in the MINFLUX mode with matching $P_k$ for 40 photons in one or more steps. To prevent dark spots next to grid positions that potentially arise from the donut zero, the usable range for d is preferably capped at about $\lambda_{exc}/2$. This arrangement provides a detection radius of about a full wavelength and significantly simplifies the setup, as it makes dedicated hardware for microsecond-scale switching between different focal intensity distributions, e.g. between a Gaussian shape and a donut shape, redundant.

What is claimed is:
1. A method for estimating positions of individual emitters in a sample, comprising:
scanning a sample region on a set of relative probe positions around an estimated position of an emitter with an excitation donut, and detecting fluorescence at the respective probe positions, wherein during scanning the emitter is in a dark state;

determining background fluorescence from the detected fluorescence;

scanning another emitter on a set of relative probe positions around the estimated position of this other emitter with an excitation donut, and detecting fluorescence at the relative probe positions; and estimating, by an estimator, a position of this other emitter from the detected fluorescence and the relative probe positions, taking into account the previously determined background fluorescence.

2. The method of claim 1, wherein the positions of the emitters are estimated in an iterative process.

3. The method of claim 2, wherein in each iteration, fluorescence at the respective relative probe positions is detected until a photon limit, corrected by the determined background fluorescence, is reached.

4. The method of claim 2, wherein an updated background fluorescence is determined from fluorescence detected for a set of relative probe positions around an emitter that has changed to a dark state.

5. The method of claim 2, wherein the estimator uses a calibration polynomial, which is specific for each of a plurality of iterations.

6. The method of claim 2, wherein the determined background is specific for each of a plurality of iterations.

7. The method of claim 1, wherein the estimator is adapted in such way that an expectancy value of the determined background fluorescence is subtracted from photon counts before estimating a position of an emitter.

8. The method of claim 1, wherein the sets of relative probe positions are illuminated multiple times.

9. The method of claim 1, wherein the sets of relative probe positions each comprise three or more probe positions, which are arranged rotationally symmetric on a circle.

10. The method of claim 9, wherein opposing probe positions of a set of relative probe positions are illuminated in sequential pairs.

11. The method of claim 1, wherein the estimator is a least-mean-squared estimator.

12. The method of claim 1, wherein the estimator uses a pattern for estimation, which has a probe position in the center, and wherein a ratio of signal and background is determined using the determined background fluorescence.

13. The method of claim 1, further comprising performing a pre-localization procedure, in which a region of interest is scanned in search for fluorescing emitters, wherein different locations of the region of interest are illuminated with an excitation beam, fluorescence is detected, and background fluorescence is determined from the detected fluorescence.

14. The method of claim 13, wherein in the pre-localization procedure, a pinhole is sequentially projected to probe positions.

15. The method of claim 13, wherein in the pre-localization procedure, imaging conditions are chosen such that most non-background emitters are in their dark state.

16. The method of claim 1, wherein for determining whether fluorescence from an emitter is detected, the sum of photon counts for a set of relative probe positions is compared with a threshold derived from an applicable current estimated background.

17. The method of claim 16, wherein the sums of photon counts are added to a histogram.

18. The method of claim 17, wherein the background fluorescence is derived from a peak of the histogram.

19. A non-transitory computer readable storage medium comprising instructions, which, when executed by a computer, cause the computer to perform a method according to claim 1 for estimating positions of individual emitters in a sample.

20. A MINFLUX microscope comprising a controller, wherein the controller is configured to estimate positions of individual emitters in a sample by:

scanning a sample region on a set of relative probe positions around an estimated position of an emitter with an excitation donut, and detecting fluorescence at the respective probe positions, wherein during scanning the emitter is in a dark state;

determining background fluorescence from the detected fluorescence;

scanning another emitter on a set of relative probe positions around the estimated position of this other emitter with an excitation donut, and detecting fluorescence at the relative probe positions; and estimating, by an estimator, a position of this other emitter from the detected fluorescence and the relative probe positions, taking into account the previously determined background fluorescence.

* * * * *